(12) United States Patent
Akiyama et al.

(10) Patent No.: US 11,692,619 B2
(45) Date of Patent: Jul. 4, 2023

(54) POWER TRANSMISSION DEVICE

(71) Applicant: TOYOTA JIDOSHA KABUSHIKI KAISHA, Aichi-ken (JP)

(72) Inventors: Yosuke Akiyama, Susono (JP); Akira Ijichi, Odawara (JP); Koji Takaira, Okazaki (JP); Akinori Homan, Toyota (JP)

(73) Assignee: TOYOTA JIDOSHA KABUSHIKI KAISHA, Aichi-ken (JP)

( * ) Notice: Subject to any disclaimer, the term of this patent is extended or adjusted under 35 U.S.C. 154(b) by 0 days.

(21) Appl. No.: 17/667,554

(22) Filed: Feb. 9, 2022

(65) Prior Publication Data

US 2022/0260144 A1 Aug. 18, 2022

(30) Foreign Application Priority Data

Feb. 12, 2021 (JP) ................. 2021-021138

(51) Int. Cl.
*F16H 57/02* (2012.01)
*F16H 48/06* (2006.01)
*F16H 3/72* (2006.01)
*F16H 7/06* (2006.01)
*F16H 48/22* (2006.01)

(52) U.S. Cl.
CPC ............... *F16H 48/06* (2013.01); *F16H 3/72* (2013.01); *F16H 7/06* (2013.01); *F16H 48/22* (2013.01); *F16H 2057/02052* (2013.01)

(58) Field of Classification Search
CPC . F16H 48/06; F16H 48/22; F16H 7/06; F16H 2057/02052; F16H 3/72
See application file for complete search history.

(56) References Cited

U.S. PATENT DOCUMENTS

| | | | | |
|---|---|---|---|---|
| 6,464,608 B2* | 10/2002 | Bowen | .................. | B60K 17/346 903/910 |
| 8,888,638 B2* | 11/2014 | Mueller | .................... | B60K 6/48 475/5 |
| 10,688,866 B2* | 6/2020 | Guo | ........................ | B60K 6/387 |
| 11,273,707 B2* | 3/2022 | Gasparovic | .............. | B60K 5/02 |
| 2007/0034428 A1* | 2/2007 | Janson | .................. | B60K 6/365 180/65.235 |

FOREIGN PATENT DOCUMENTS

WO  2010141682 A1  12/2010

OTHER PUBLICATIONS

Unpublished U.S. Appl. No. 17/668,289, filed Feb. 9, 2022, 45pp.

* cited by examiner

*Primary Examiner* — Tinh Dang
(74) *Attorney, Agent, or Firm* — Hauptman Ham, LLP

(57) ABSTRACT

A power transmission device includes a first input shaft configured to input power from a first power source, a second input shaft configured to input power from a second power source, a first output shaft configured to transmit power to a first drive wheel, a second output shaft configured to transmit power to a second drive wheel, and a differential gear including, as three rotation elements, a first rotation element to which the second input shaft is connected, a second rotation element to which the second output shaft is connected, and a third rotation element to which the first input shaft and the first output shaft are connected, in which an engagement device configured to selectively connect any two of the three rotation elements is provided.

13 Claims, 9 Drawing Sheets

ENGINE SIDE ↔ AXIAL DIRECTION

ENGINE SIDE ←→ AXIAL DIRECTION

ENGINE SIDE ⟵⟶ AXIAL DIRECTION

ENGINE SIDE ←→ AXIAL DIRECTION

ENGINE SIDE ↔ AXIAL DIRECTION

ENGINE SIDE ←→ AXIAL DIRECTION

POWER TRANSMISSION DEVICE

CROSS-REFERENCE TO RELATED APPLICATION

This application claims priority to Japanese Patent Application No. 2021-021138 filed on Feb. 12, 2021, incorporated herein by reference in its entirety.

BACKGROUND

1. Technical Field

The present disclosure relates to a power transmission device.

2. Description of Related Art

A transfer is known in which power from an engine (first power source) is distributed and transmitted to front wheels and rear wheels, as a power transmission device mounted on a vehicle. An output side of the transfer is connected to a front wheel propeller shaft and a rear wheel propeller shaft. Further, in the transfer, it is possible to switch a state between a two-wheel drive state where the power is output to solely one propeller shaft and a four-wheel drive state where the power is output to both the propeller shafts.

WO 2010/141682 discloses a transfer including an auxiliary power source (second power source) in a transfer case, in which power output from the second power source is transmitted to front wheels and rear wheels via a differential gear. With a configuration disclosed in WO 2010/141682, the differential gear can function as a transmission by fixing one rotation element of three rotation elements included in the differential gear to the transfer case, and the differential gear can change the rotation of the first power source and transmit the changed rotation to an output member.

SUMMARY

With the configuration disclosed in WO 2010/141682, in a case where four-wheel drive is performed in a state where the differential gear has a differential action, a torque of the second power source acts on a first output shaft and a second output shaft, so that directions the torques of the respective output shafts may be opposite to each other.

The present disclosure is to provide a power transmission device capable of suppressing opposing of directions of torques of respective output shafts in a case where power is transmitted via a differential gear.

An aspect of the present disclosure relates to a power transmission device includes a first input shaft, a second input shaft, a first output shaft, a second output shaft, and a differential gear. The first input shaft is configured to input power from a first power source. The second input shaft is configured to input power from a second power source. The first output shaft is configured to output power to a first drive wheel. The second output shaft is configured to output power to a second drive wheel. The differential gear includes, as three rotation elements, a first rotation element to which the second input shaft is connected, a second rotation element to which the second output shaft is connected, and a third rotation element to which the first input shaft and the first output shaft are connected. In the power transmission device, an engagement device configured to selectively connect any two of the three rotation elements is provided.

With this configuration, the engagement device can limit a differential action of the differential gear by connecting any two of the three rotation elements included in the differential gear. As a result, in a case where the power is transmitted via the differential gear, when the differential action of the differential gear is limited by the engagement device, it is possible to suppress opposing of directions of torques of the respective output shafts.

In addition, the engagement device may be switched between an engagement state where the three rotation elements are integrally rotatable and a disengagement state where the three rotation elements are differentially rotatable.

With this configuration, by switching the engagement device between the engagement state and the disengagement state, it is possible to switch a state between a state where the differential action of the differential gear is limited and a state where the differential action is not limited.

In addition, the engagement device may be configured to selectively connect the second rotation element and the third rotation element.

With this configuration, in a case where the second rotation element and the third rotation element are connected by the engagement device, the three rotation elements can be integrally rotated. As a result, the differential action of the differential gear can be limited, and even in a case where the torque of the second power source acts, it is possible to suppress the opposing of the directions of the torques of the first output shaft and the second output shaft.

In addition, the engagement device may be a friction engagement device.

With this configuration, the engagement device can be configured by the friction engagement device.

In addition, the engagement device may be configured to selectively connect the first rotation element and the second rotation element.

With this configuration, in a case where the first rotation element and the second rotation element are connected by the engagement device, the three rotation elements can be integrally rotated. As a result, the differential action of the differential gear can be limited, and even in a case where the torque of the second power source acts, it is possible to suppress the opposing of the directions of the torques of the first output shaft and the second output shaft.

In addition, the differential gear may be a planetary gear device.

With this configuration, the differential gear can be configured by the planetary gear device.

In addition, the power transmission device may further include a first transmission device provided in a power transmission path between the differential gear and the second output shaft, in which the first output shaft is disposed on the same axis as the first input shaft, and the second output shaft is disposed parallel to the first output shaft and is connected to the differential gear via the first transmission device to be able to transmit power.

With this configuration, the power can be transmitted to the second output shaft and the second drive wheel via the differential gear and the first transmission device.

In addition, the first transmission device may include a chain belt.

With this configuration, the first transmission device can be a mechanism including the chain belt.

In addition, the first transmission device and the differential gear may be disposed in this order from a side of the first power source on the same axis as the first output shaft, and the second output shaft may extend from the first transmission device to the side of the first power source in an axial direction.

With this configuration, the second output shaft can be shortened by positioning the first transmission device closer to the side of the first power source than the differential gear.

In addition, the first transmission device and the engagement device may be disposed in this order from a side of the first power source on the same axis as the first output shaft, and the second output shaft may extend from the first transmission device to the side of the first power source in an axial direction.

With this configuration, the second output shaft can be shortened by positioning the first transmission device closer to the side of the first power source than the engagement device.

In addition, the differential gear and the second power source may be disposed in this order from a side of the first power source on the same axis as the first output shaft, and the second output shaft may extend from a position between the differential gear and the second power source to the side of the first power source in an axial direction.

With this configuration, the second output shaft can be shortened by the second output shaft extending from a position in the axial direction between the differential gear and the second power source to the side of the first power source.

In addition, the power transmission device may further include a second transmission device provided in a power transmission path between the second power source and the differential gear, in which the second power source is disposed on a different axis from the first output shaft and the second output shaft and is connected to the differential gear via the second transmission device to be able to transmit power.

With this configuration, a degree of freedom in the disposition of the second power source or the disposition of the differential gear can be obtained.

In addition, the second transmission device may be a speed reducer.

With this configuration, the rotation of the second power source can be decelerated and transmitted to the second input shaft.

In the present disclosure, the engagement device can limit the differential action of the differential gear by connecting any two of the three rotation elements included in the differential gear. As a result, in a case where the power is transmitted via the differential gear, when the differential action of the differential gear is limited by the engagement device, it is possible to suppress the opposing of the directions of the torques of the respective output shafts.

BRIEF DESCRIPTION OF THE DRAWINGS

Features, advantages, and technical and industrial significance of exemplary embodiments of the disclosure will be described below with reference to the accompanying drawings, in which like signs denote like elements, and wherein.

DETAILED DESCRIPTION OF EMBODIMENTS

Hereinafter, a power transmission device according to an embodiment of the present disclosure will be specifically described with reference to the drawings. Note that the present disclosure is not limited to the embodiment described below.

Figure 1:
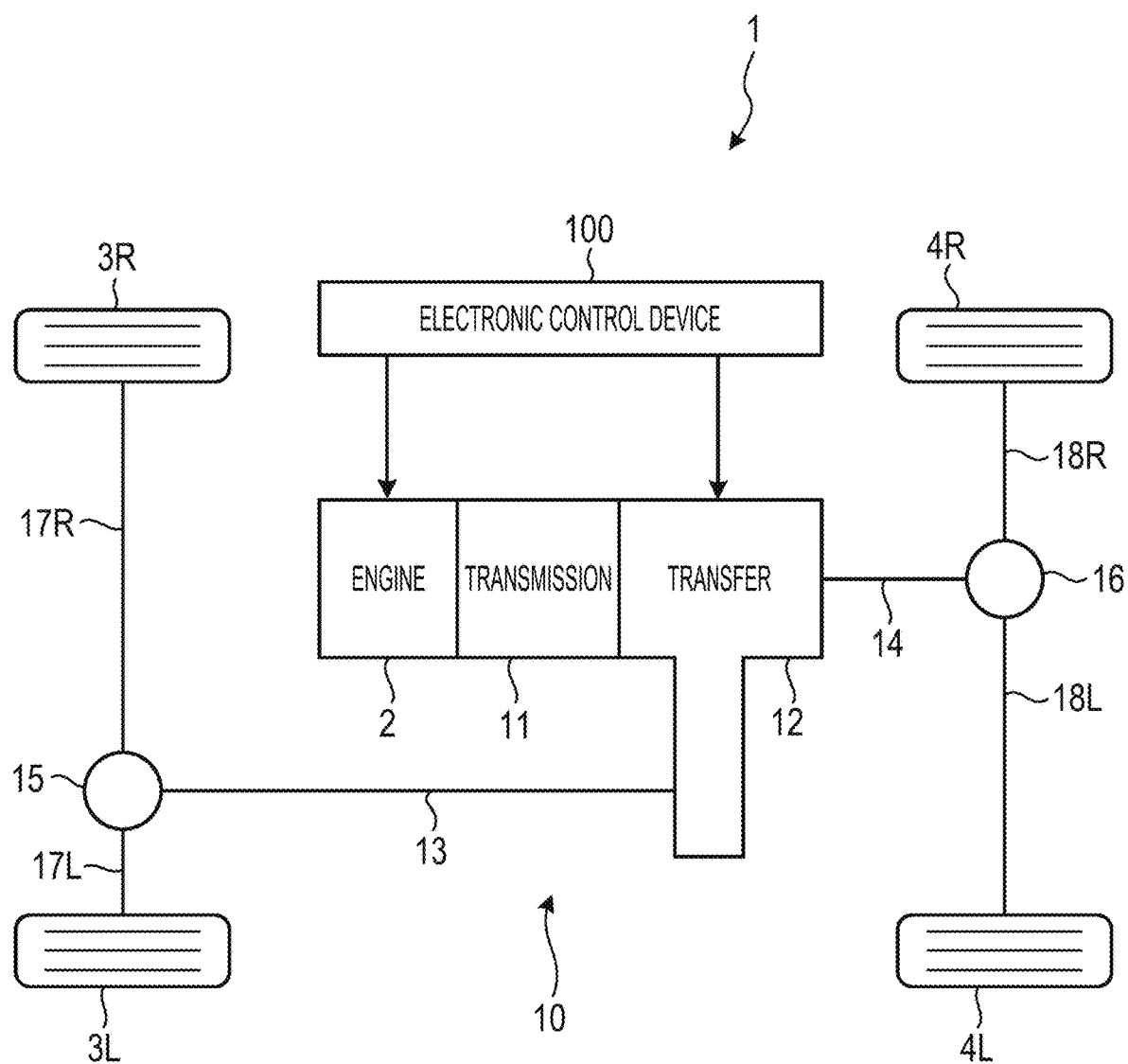
FIG. 1 is a skeleton diagram schematically showing a vehicle equipped with a power transmission device according to an embodiment.

FIG. 1 is a skeleton diagram schematically showing a vehicle equipped with the power transmission device according to the embodiment. A vehicle 1 includes an engine 2 as a power source, right and left front wheels 3R, 3L, right and left rear wheels 4R, 4L, and a power transmission device 10 that transmits power of the engine 2 to the front wheels 3 and the rear wheels 4, respectively. The vehicle 1 is a front engine rear wheel drive based four-wheel drive vehicle. The rear wheels 4 are main drive wheels that serve as drive wheels during both two-wheel drive traveling and four-wheel drive traveling. On the other hand, the front wheels 3 are auxiliary drive wheels that serve as driven wheels during the two-wheel drive traveling and serve as drive wheels during the four-wheel drive traveling. In the present embodiment, the rear wheels 4 are first drive wheels and the front wheels 3 are second drive wheels.

The power transmission device 10 includes a transmission 11 connected to the engine 2, a transfer 12 that is a front-rear wheel power distribution device connected to the transmission 11, a front propeller shaft 13 and a rear propeller shaft 14 connected to the transfer 12, respectively, a front wheel differential gear mechanism 15 connected to the front propeller shaft 13, a rear wheel differential gear mechanism 16 connected to the rear propeller shaft 14, right and left front wheel axles 17R, 17L connected to the front wheel differential gear mechanism 15, and right and left rear wheel axles 18R, 18L connected to the rear wheel differential gear mechanism 16. Note that in a case where the right and left wheels and the right and left axles are not particularly distinguished, the reference characters R, L are omitted, and the terms are described as the front wheels 3, the rear wheels 4, the front wheel axles 17, and the rear wheel axles 18.

The power output from the engine 2 is transmitted to the transfer 12 via the transmission 11. Further, the power transmitted to the transfer 12 is transmitted from the transfer 12 to the rear wheels 4 in sequence via the rear propeller shaft 14, the rear wheel differential gear mechanism 16, and a rear wheel side power transmission path of the rear wheel axles 18. In addition, a part of the power transmitted to a side of the rear wheels 4 is distributed to a side of the front wheels 3 by the transfer 12, and is transmitted to the front wheels 3 in sequence via the front propeller shaft 13, the front wheel differential gear mechanism 15, a front wheel side power transmission path of the front wheel axles 17.

Figure 2:
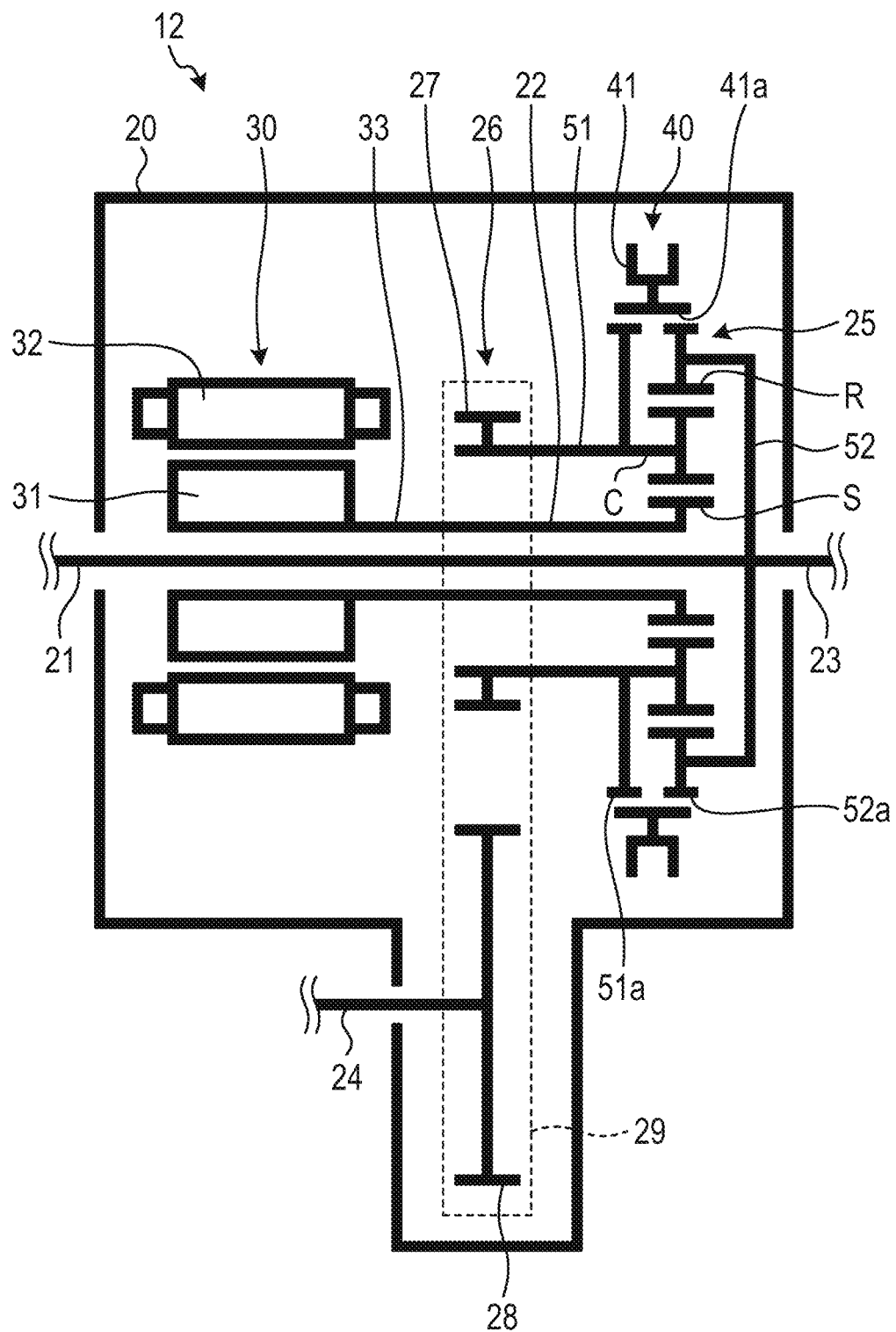
FIG. 2 is a skeleton diagram schematically showing a configuration of a transfer according to the embodiment.

FIG. 2 is a skeleton diagram schematically showing a configuration of the transfer according to the embodiment. The transfer 12 includes a transfer case 20 that is a non-rotation member. In addition, the transfer 12 includes a first input shaft 21, a second input shaft 22, a rear wheel side output shaft 23, a front wheel side output shaft 24, a planetary gear device 25, a transmission device 26, a motor 30, and an engagement device 40 in the transfer case 20.

The first input shaft 21 is an input member inputting the power from the engine 2 to the transfer 12. The power from the engine 2 is transmitted to the first input shaft 21 via the transmission 11. For example, the first input shaft 21 is fitted to an output member of the transmission 11 by spline.

The second input shaft 22 is an input member inputting the power from the motor 30 to the planetary gear device 25. The power from the motor 30 is input to the second input shaft 22 as it is. For example, the second input shaft 22 is fitted to an output member (rotor shaft 33) of the motor 30 by spline and is rotated integrally with the rotor shaft 33.

The rear wheel side output shaft 23 is an output member outputting the power from the transfer 12 to the rear wheels 4. The rear wheel side output shaft 23 is a main drive shaft disposed on the same axis as the first input shaft 21 and connected to the rear propeller shaft 14. In the transfer 12, the rear wheel side output shaft 23 is a first output shaft.

The front wheel side output shaft 24 is a second output shaft outputting the power from the transfer 12 to the front wheels 3. The front wheel side output shaft 24 is an auxiliary drive shaft disposed on a different axis from the first input shaft 21 and the rear wheel side output shaft 23 and connected to the front propeller shaft 13. In the transfer 12, the front wheel side output shaft 24 is the second output shaft disposed in parallel to the first output shaft and connected to the planetary gear device 25 via the transmission device 26 to be able to transmit the power.

The planetary gear device 25 is a differential gear including three rotation elements, and is configured by a single pinion type planetary gear device. The planetary gear device 25 functions as a power split device that divides the power of the power source into the front wheels 3 and the rear wheels 4.

As shown in FIG. 2, the planetary gear device 25 includes, as the three rotation elements, a sun gear S, a carrier C that supports a plurality of pairs of pinion gears that mesh with each other such that the pinion gears can perform rotation and can perform revolution, and a ring gear R that meshes with the sun gear S via the pinion gears. In the present embodiment, the sun gear S is a first rotation element, the carrier C is a second rotation element, and the ring gear R is a third rotation element.

The second input shaft 22 is connected to the sun gear S to be integrally rotated. That is, the motor 30 is connected to the sun gear S.

A first rotation member 51 is connected to the carrier C to be integrally rotated. The first rotation member 51 is a member that is rotated integrally with the carrier C, and includes gear teeth 51a as an engagement element. A drive gear 27 of the transmission device 26 is connected to the first rotation member 51 to be integrally rotated. The transmission device 26 forms the power transmission path between the planetary gear device 25 and the front wheel side output shaft 24. That is, the front wheel side output shaft 24 is connected to the carrier C.

A second rotation member 52 is connected to the ring gear R to be integrally rotated. The second rotation member 52 is a member that is rotated integrally with the ring gear R, and includes gear teeth 52a as the engagement element. The first input shaft 21 and the rear wheel side output shaft 23 are connected to the second rotation member 52 to be integrally rotated. That is, the first input shaft 21 and the rear wheel side output shaft 23 are connected to the ring gear R.

The transmission device 26 is a mechanism that forms the front wheel side power transmission path, and is provided in the power transmission path between the planetary gear device 25 and the front wheel side output shaft 24. The transmission device 26 includes a drive gear 27, a driven gear 28, and a chain belt 29.

The drive gear 27 is a rotation member that functions as an output unit to a front wheel side, and is an output gear that transmits the power to the front wheel side output shaft 24. The drive gear 27 is disposed on the same axis as the first input shaft 21 and the rear wheel side output shaft 23 to be rotatable relative to the first input shaft 21 and the rear wheel side output shaft 23, and is connected to the carrier C to be integrally rotated. In the transfer 12, the drive gear 27 and the rotation elements of the planetary gear device 25 are disposed on the same rotation center as the rear wheel side output shaft 23.

The driven gear 28 is a gear provided integrally with the front wheel side output shaft 24. The chain belt 29 is a front wheel drive chain connecting the drive gear 27 and the driven gear 28. Further, the driven gear 28 is rotated as the drive gear 27 is rotated, and the driven gear 28 and the front wheel side output shaft 24 are integrally rotated. In the present embodiment, the transmission device 26 is a first transmission device.

The motor 30 is a rotation electric machine (motor generator) capable of functioning as an electric motor and an electric power generator. In addition, the motor 30 is electrically connected to a battery via an inverter. The motor 30 includes a rotor 31, a stator 32, and the rotor shaft 33. The rotor 31 is rotated integrally with the rotor shaft 33. The stator 32 includes a stator core and a stator coil wound around the stator core. The second input shaft 22 is connected to the rotor shaft 33 to be integrally rotated.

The engagement device 40 is a clutch that switches a state of the planetary gear device 25, and switches the state between an engagement state and a disengagement state. The engagement device 40 connects the carrier C and the ring gear R to be integrally rotated. Further, the engagement device 40 switches the state between an integrated state where the carrier C and the ring gear R can be integrally rotated and a differential state where the carrier C and the ring gear R can be rotated relative to each other. That is, the engagement device 40 switches the state between the engagement state where a differential action of the planetary gear device 25 is limited and the disengagement state where the differential action of the planetary gear device 25 is not limited.

The engagement device 40 is configured by a dog clutch and includes a switching sleeve 41. The switching sleeve 41 includes gear teeth 41a as the engagement element. The gear teeth 41a mesh with the gear teeth 51a of the first rotation member 51 that is rotated integrally with the carrier C and the gear teeth 52a of the second rotation member 52 that is rotated integrally with the ring gear R. In addition, the switching sleeve 41 is moved in an axial direction by an actuator of the engagement device 40. Further, the switching sleeve 41 is switched between the integrated state where the carrier C and the ring gear R are connected to be integrally rotatable and the differential state where the three rotation elements have the differential action. That is, the engagement device 40 is in the engagement state by the gear teeth 41*a* of the switching sleeve 41 meshing with both the gear teeth 51*a* and the gear teeth 52*a*, and in the disengagement state by the gear teeth 41*a* of the switching sleeve 41 meshing with solely one of the gear teeth 51*a* and the gear teeth 52*a*.

In addition, in the transfer case 20, the motor 30, the transmission device 26, and the planetary gear device 25 are disposed in this order on the same axis as the rear wheel side output shaft 23 from an engine side in the axial direction. Moreover, the front wheel side output shaft 24 extends from the transmission device 26 to the engine side in the axial direction.

Further, in a case where the transfer 12 is in a four-wheel drive state, the differential state where a rotational differential between the rear propeller shaft 14 and the front propeller shaft 13 is not limited and non-differential state where the rotational differential between the rear propeller shaft 14 and the front propeller shaft 13 is limited are switched. That is, in the transfer 12 in a power split state, a case where the rear wheel side output shaft 23 and the drive gear 27 are in a differential state and a case where the rear wheel side output shaft 23 and the drive gear 27 are in the non-differential state can be switched.

In addition, as shown in FIG. 1, the vehicle 1 includes an electronic control device 100 that controls the vehicle 1. The electronic control device 100 outputs a command signal to the actuator that operates the engagement device 40, and controls the operation of the engagement device 40. For example, the electronic control device 100 includes a microcomputer including a CPU, a RAM, a ROM, and an input and output interface. The CPU executes various controls of the vehicle 1 by performing signal processing in response to a program stored in the ROM in advance while using a transitory storage function of the RAM.

Signals from various sensors mounted on the vehicle 1 are input to the electronic control device 100. For example, sensor signals from an engine rotation speed sensor, a motor rotation angle sensor, a vehicle speed sensor, an accelerator operation amount sensor, and a 4WD selection switch for selecting the four-wheel drive state by an operation of a driver are input to the electronic control device 100. The electronic control device 100 executes a drive control and the like of the vehicle 1 based on the input sensor signals. Further, a command signal for controlling the engine 2, a command signal for controlling the transmission 11, a command signal for controlling the transfer 12, and the like are output from the electronic control device 100. A command signal for controlling the motor 30 and a command signal for controlling the engagement device 40 are included in the command signal for controlling the transfer 12.

Therefore, in a case where the drive state of the transfer 12 is controlled, the electronic control device 100 controls the operation of the motor 30 and the state of the engagement device 40 to control the state of the planetary gear device 25. The planetary gear device 25 can be switched between the integrated state and the differential state by the electronic control device 100 executing a switching control of the engagement device 40. The integrated state is a state where two rotation elements of the three rotation elements included in the planetary gear device 25 are connected to each other. The differential state is a state where the three rotation elements included in the planetary gear device 25 can have the differential action. Further, in the transfer 12, the three rotation elements are connected to the motor 30, the engine 2, the rear wheel side output shaft 23, and the front wheel side output shaft 24, respectively, regardless of the state of the planetary gear device 25.

Figure 3:
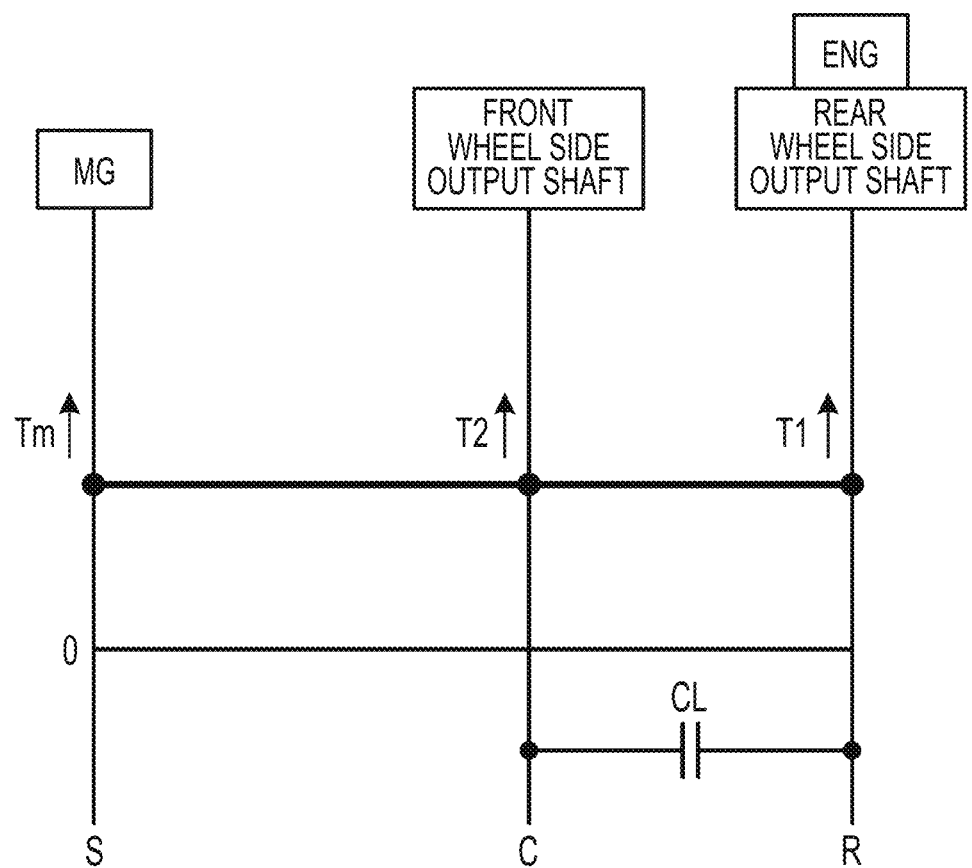
FIG. 3 is a collinear diagram showing a state of rotation elements in a planetary gear device in an integrated state.

FIG. 3 is a collinear diagram showing the state of the rotation elements in the planetary gear device in the integrated state. Note that, in FIG. 3, the motor 30 is "MG", the engine 2 is described as "ENG", the sun gear S is described as "S", the carrier C is described as "C", the ring gear R is described as "R", and the engagement device 40 is described as "CL".

In the transfer 12, as shown in FIG. 3, the planetary gear device 25 is in the integrated state by the engagement device 40 in the engagement state. In the integrated state, a fixed distribution 4WD mode is possible as the four-wheel drive state where the power is transmitted to the front wheels 3 and the rear wheels 4. That is, in a case where the transfer 12 is in the fixed distribution 4WD mode, the switching sleeve 41 meshes with the first rotation member 51 and the second rotation member 52.

In the fixed distribution 4WD mode, the power transmitted from the engine 2 to the first input shaft 21 is transmitted to the rear wheel side output shaft 23, and is transmitted to the front wheel side output shaft 24 via the planetary gear device 25 in the integrated state. That is, in the fixed distribution 4WD mode, in a case where the power of the engine 2 is distributed to the front wheel side output shaft 24, the differential action of the planetary gear device 25 is limited by the engagement device 40 in the engagement state, and the three rotation elements have the same rotation speed. Therefore, in a case where a torque Tm of the motor 30 is caused to act on the front wheel side output shaft 24, both a torque T2 acting on the front wheel side output shaft 24 and a torque T1 acting on the rear wheel side output shaft 23 can be set to the torque in a positive direction. As a result, in a case where the torque Tm of the motor 30 is transmitted to the front wheel side output shaft 24 via the planetary gear device 25, it is possible to suppress the opposing of directions of the torques T1, T2 of the respective output shafts. Note that the fact that the opposing of the torques of the respective output shafts means that in a case where the motor 30 outputs the torque such that the torque in the positive direction acts on the front wheel side output shaft 24, by the torque reaction force acting on the rear wheel side output shaft 23, the torque of the front wheel side output shaft 24 has the positive direction, whereas the torque of the rear wheel side output shaft 23 has a negative direction. That is, the fact that the opposing of the directions of the torques of the respective output shafts means that the directions of the torques of the front wheel side output shaft 24 and the rear wheel side output shaft 23 are opposite to each other. In the present embodiment, the motor 30 outputs the torque in the positive direction in order to cause the torque in the positive direction to act on the front wheel side output shaft 24.

In addition, in the transfer 12, the planetary gear device 25 is in the differential state by the engagement device 40 in the disengagement state. In the differential state, a so-called torque split 4WD mode is possible as the four-wheel drive state where the power is transmitted to the front wheels 3 and the rear wheels 4. The torque split 4WD mode is intended to generate a driving force on the front wheels 3 by the power of the motor 30 and change the power distribution transmitted to the rear wheel side output shaft 23 and the front wheel side output shaft 24. That is, in the torque split 4WD mode, a front-rear distribution control is possible by the motor torque output from the motor 30. In a case where the transfer 12 is in the torque split 4WD mode, the switching sleeve 41 meshes with solely one of the first rotation member 51 and the second rotation member 52.

In this torque split 4WD mode, the power transmitted from the engine 2 to the first input shaft 21 is transmitted to the rear wheel side output shaft 23, and the power transmitted from the motor 30 to the second input shaft 22 is transmitted to the front wheel side output shaft 24 via the planetary gear device 25 in the differential state. That is, in the torque split 4WD mode, in a case where the power from the power source is distributed to the front wheels 3 and the rear wheels 4, the planetary gear device 25 can be differentially rotated by the engagement device 40 in the disengagement state. Therefore, in the torque split 4WD mode, it is possible to control the distribution of the power transmitted to a front wheel side and a rear wheel side by the torque output from the motor 30. In this case, since the differential action of the planetary gear device 25 is not limited, in a case where the torque in the positive direction is caused to act on the front wheel side output shaft 24 by the motor 30, the torque in the negative direction acts on the rear wheel side output shaft 23 due to the torque reaction force. That is, the torque in the positive direction due to the torque from the engine 2 and the torque in the negative direction due to the torque reaction force of the motor torque act on the rear wheel side output shaft 23.

As described above, according to the embodiment, it is possible to selectively limit the differential action of the planetary gear device 25 by switching the engagement device 40 between the engagement state and the disengagement state. Therefore, in a case where the differential action of the planetary gear device 25 is limited, even when the torque in the positive direction is caused to act on the front wheel side output shaft 24 by the torque of the motor 30, it is possible to suppress the opposing of the directions of the torques of the respective output shafts.

Note that since the motor 30 is configured by the rotation electric machine (motor generator), it is possible to generate an electric power by the power from the engine 2 or to perform regenerative power generation by the power input from the drive wheels. The battery stores the electric power generated by the motor 30. Moreover, the first power source and the second power source may be either the engine or the rotation electric machine. For example, the first power source may be the rotation electric machine, and the second power source may be the engine.

Figure 4:
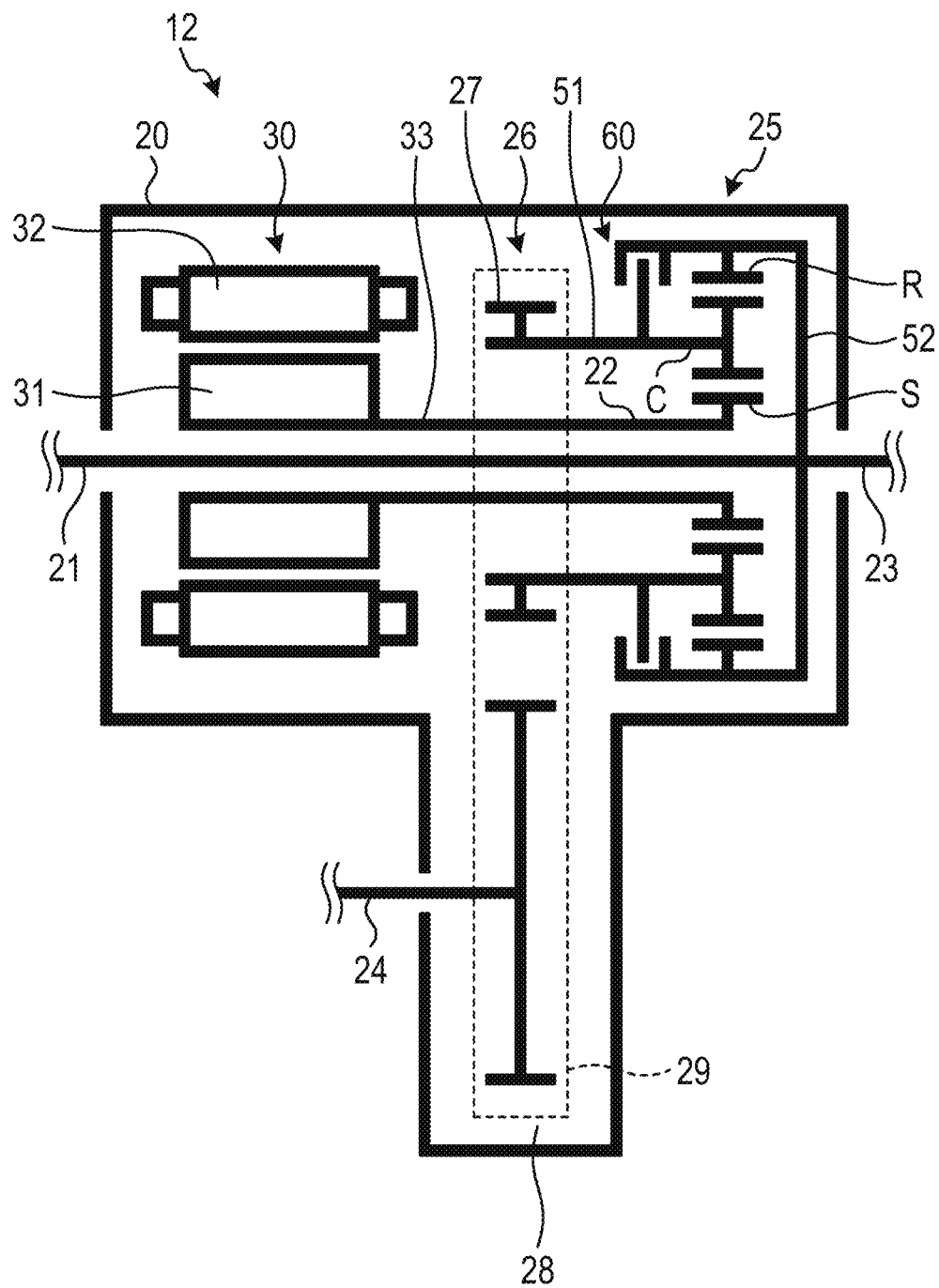
FIG. 4 is a skeleton diagram schematically showing a configuration of a transfer according to a first modification example.

In addition, as a modification example of the embodiment described above, a friction type engagement device may be provided instead of the meshing type engagement device 40. For example, as shown in FIG. 4, the transfer 12 according to a first modification example includes a friction engagement device 60 that selectively connects the carrier C and the ring gear R.

The friction engagement device 60 selectively connects the first rotation member 51 that is rotated integrally with the carrier C and the second rotation member 52 that is rotated integrally with the ring gear R. The friction engagement device 60 has a first friction engagement element that is rotated integrally with the first rotation member 51, and a second friction engagement element that is rotated integrally with the second rotation member 52. Further, the friction engagement device 60 is operated by a hydraulic actuator. In addition, in the first modification example, the motor 30, the transmission device 26, the friction engagement device 60, and the planetary gear device 25 are disposed in this order on the same axis as the rear wheel side output shaft 23 from the engine side in the axial direction. The friction engagement device 60 is positioned behind the transmission device 26, so that the front wheel side output shaft 24 can be shortened.

Moreover, in a case where the three rotation elements are integrated in order to limit the differential action of the planetary gear device 25, the configuration is not limited to a case where the carrier C and the ring gear R are connected to be integrally rotatable. That is, the two rotation elements that are connected to be integrally rotatable are not particularly limited, and any two of the three rotation elements need only be selectively connected in the planetary gear device 25. For example, as shown in FIG. 5, the transfer 12 according to a second modification example includes a friction engagement device 61 that selectively connects the sun gear S and the ring gear R.

The friction engagement device 61 selectively connects a third rotation member 53 that is rotated integrally with the sun gear S and the second rotation member 52 that is rotated integrally with the ring gear R. The friction engagement device 61 has a first friction engagement element that is rotated integrally with the third rotation member 53, and a second friction engagement element that is rotated integrally with the second rotation member 52. Further, the friction engagement device 61 is operated by the hydraulic actuator. Moreover, in this second modification example, the motor 30, the transmission device 26, the planetary gear device 25, and the friction engagement device 61 are disposed in this order on the same axis as the rear wheel side output shaft 23 from the engine side in the axial direction. The friction engagement device 61 is positioned behind the transmission device 26, so that the front wheel side output shaft 24 can be shortened.

Figure 5:
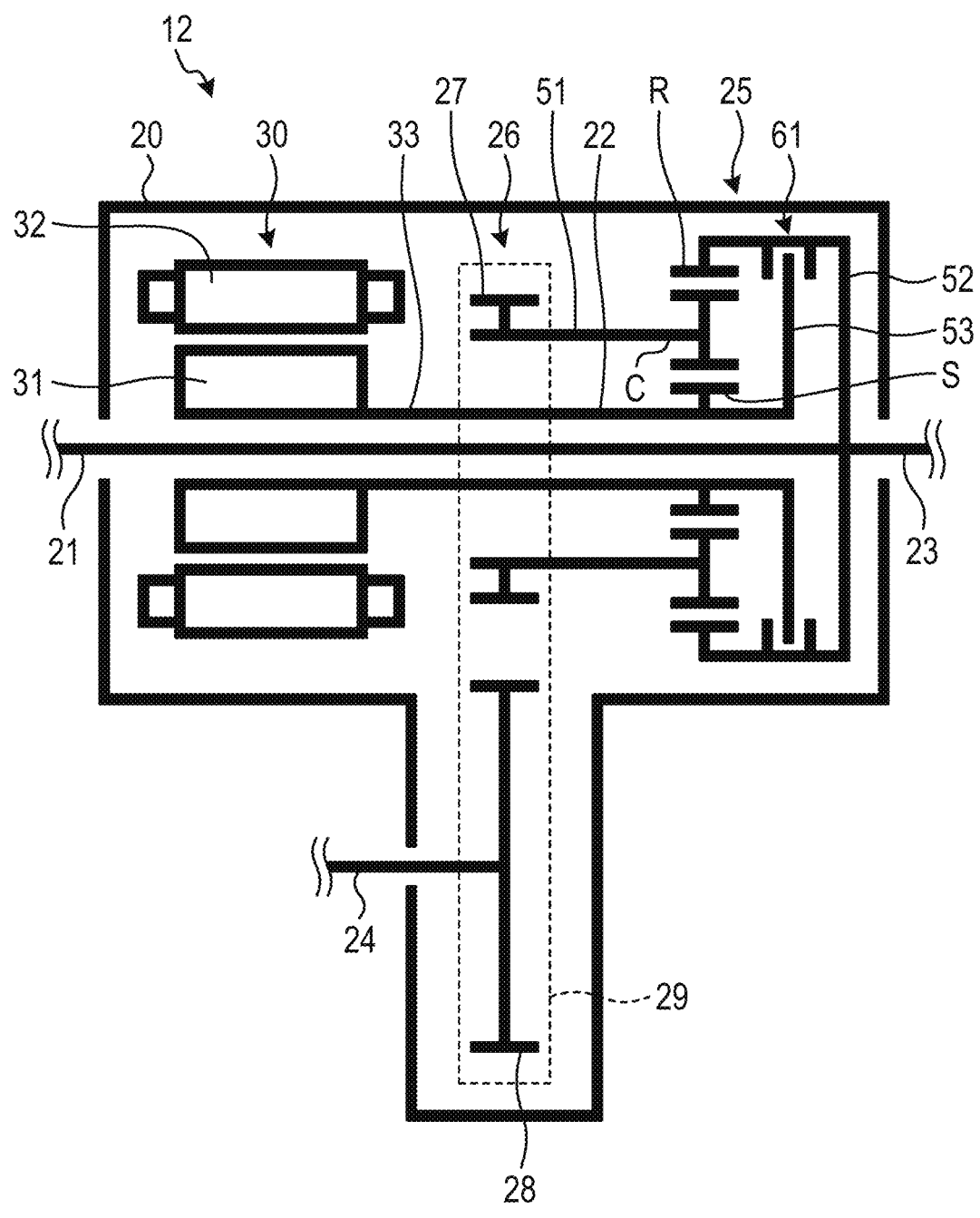
FIG. 5 is a skeleton diagram schematically showing a configuration of a transfer according to a second modification example.
Figure 6:
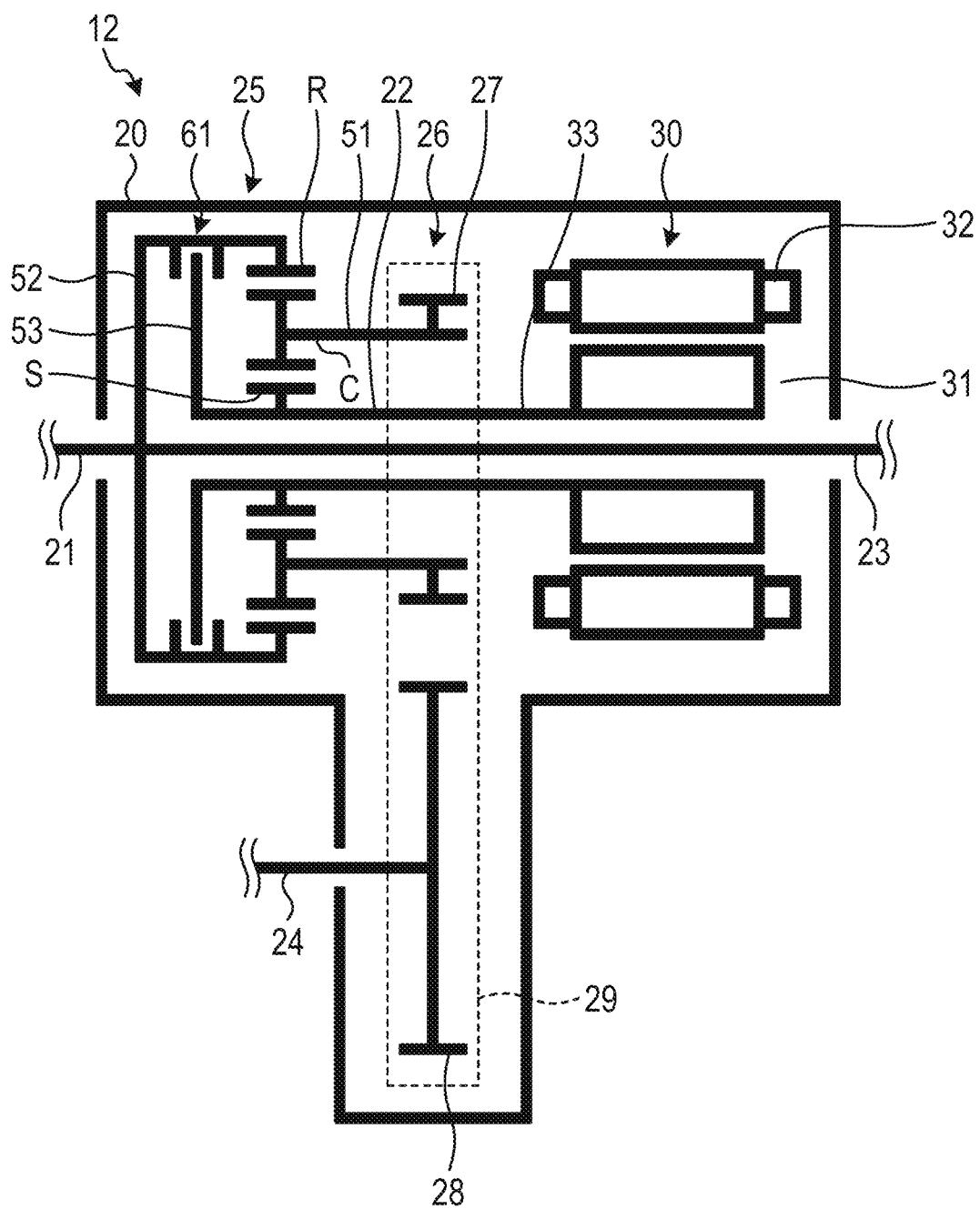
FIG. 6 is a skeleton diagram schematically showing a configuration of a transfer according to a third modification example.

In addition, as an additional modification example of the second modification example, the dispositions of the motor 30, the transmission device 26, the planetary gear device 25, and the friction engagement device 61 in the axial direction may be different from the dispositions shown in FIG. 5. For example, as shown in FIG. 6, in the transfer 12 according to a third modification example, the friction engagement device 61, the planetary gear device 25, the transmission device 26, and the motor 30 are disposed in this order from the engine side in the axial direction. As a result, a degree of freedom in the disposition of the motor 30 or the disposition of the planetary gear device 25 can be obtained.

In addition, as another modification example, the motor 30 is not limited to a configuration in which the motor 30 is disposed on the same axis as the first input shaft 21 and the rear wheel side output shaft 23, and the motor 30 may be disposed on a different axis from the first input shaft 21 and the rear wheel side output shaft 23. An example of this modification example is shown in FIGS. 7 and 8.

Figure 7:
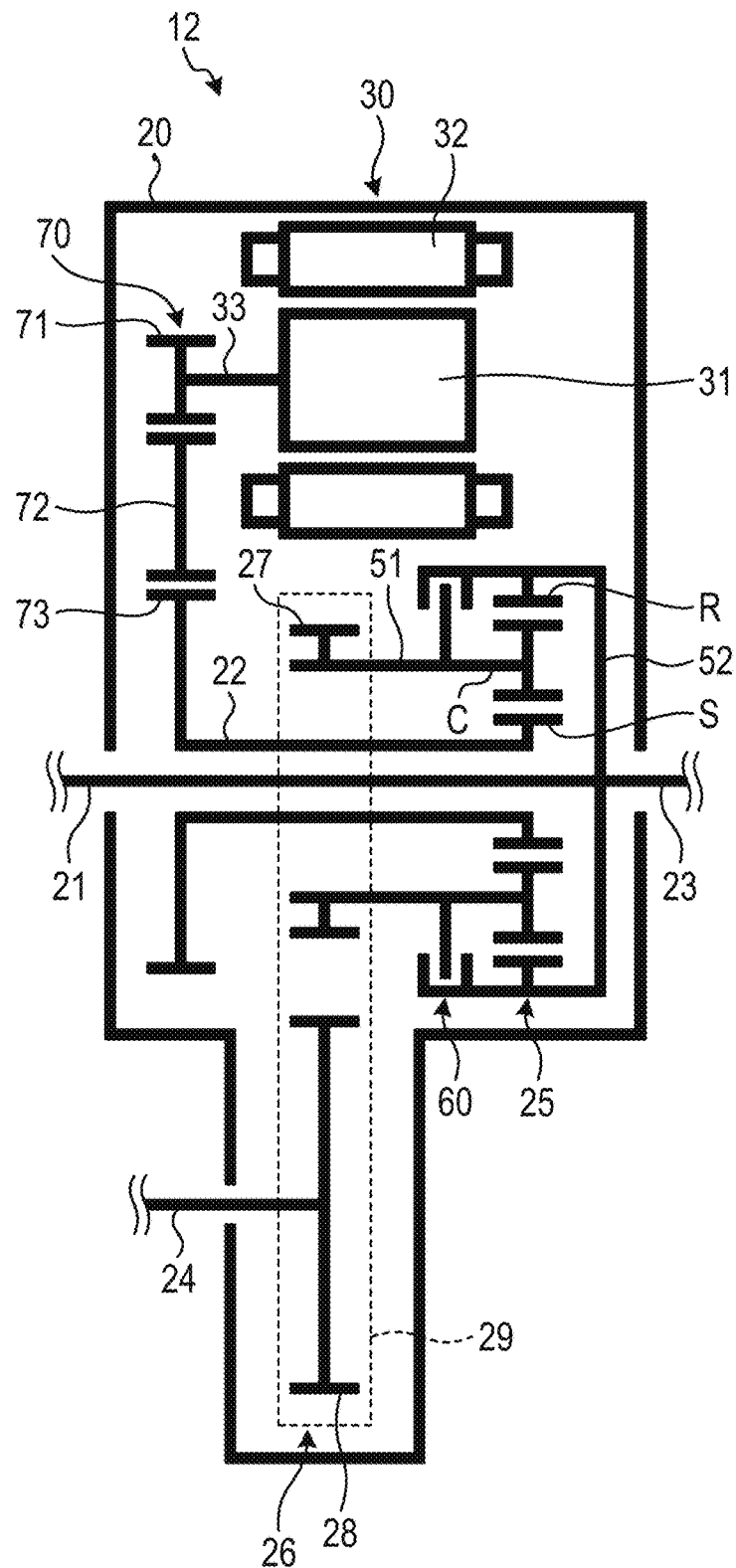
FIG. 7 is a skeleton diagram schematically showing a configuration of a transfer according to a fourth modification example.

For example, as shown in FIG. 7, the transfer 12 according to a fourth modification example includes the motor 30 disposed on a different axis from the first input shaft 21 and the second input shaft 22, and a second transmission device 70 provided in the power transmission path between the motor 30 and the second input shaft 22. This fourth modification example is an additional modification example of the second modification example. Further, in the transfer 12, the second transmission device 70, the transmission device 26, the friction engagement device 60, and the planetary gear device 25 are disposed in this order from the engine side in the axial direction.

The second transmission device 70 includes a reduction gear 71, a counter gear 72, and an input gear 73. The reduction gear 71 is provided on the rotor shaft 33 of the motor 30. The reduction gear 71 meshes with the counter gear 72. The counter gear 72 meshes with the input gear 73. The input gear 73 is attached to the second input shaft 22 and is rotated integrally with the second input shaft 22. Further, a reduction gear train is formed by the reduction gear 71, the counter gear 72, and the input gear 73. Therefore, in the fourth modification example, in a case where the power output from the motor 30 is transmitted to the second input shaft 22 via the second transmission device 70, the rotation of the motor 30 is changed (decelerated) and transmitted to the sun gear S. In addition, since the motor 30 is disposed on a different axis from the first input shaft 21 and the rear wheel side output shaft 23, the motor 30 can be disposed at a position that overlaps with the transmission device 26 in the axial direction, and a body of the transfer 12 in the axial direction can be miniaturized. As described above, the degree of freedom in the disposition of the motor 30 or the disposition of the planetary gear device 25 can be obtained.

Figure 8:
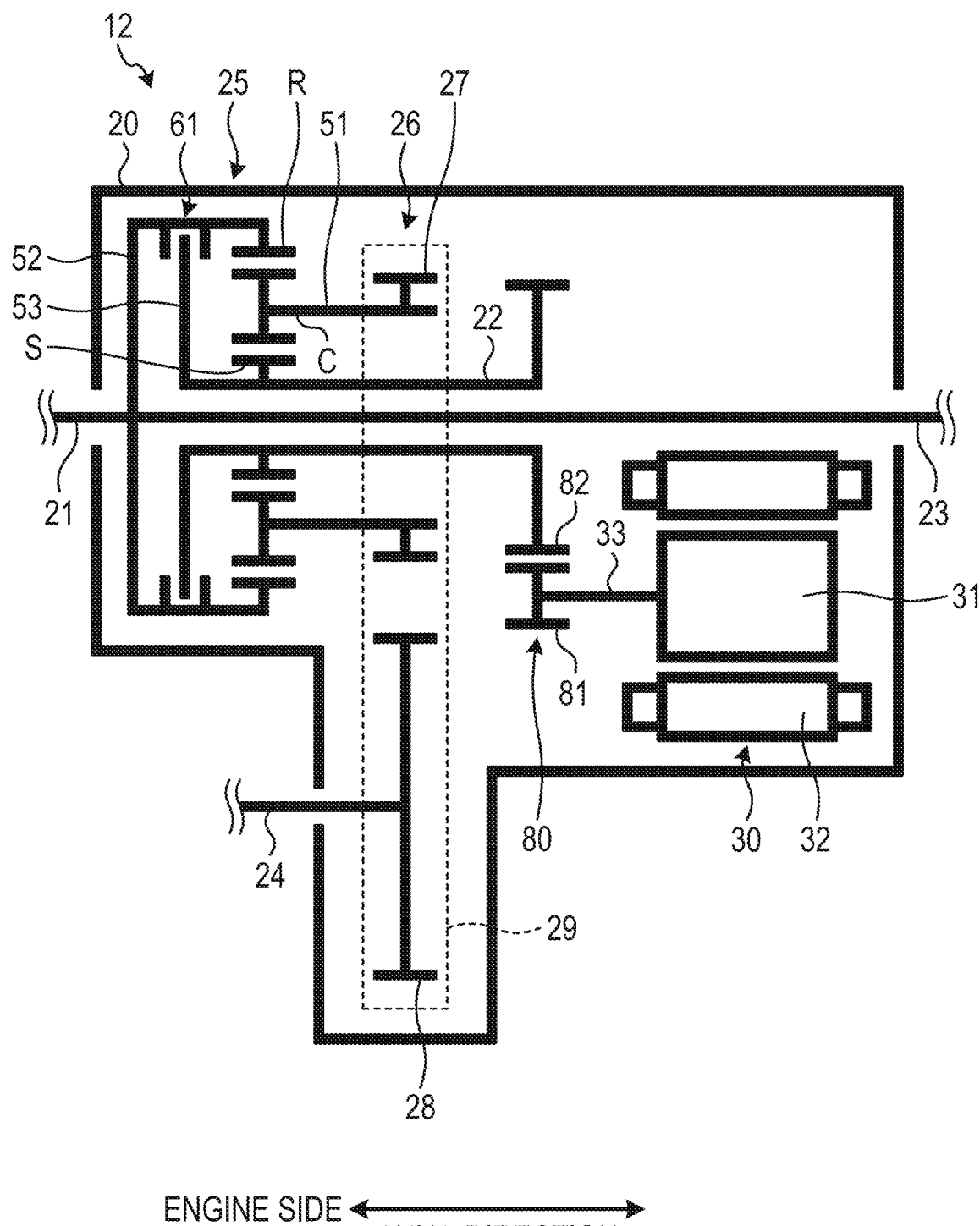
FIG. 8 is a skeleton diagram schematically showing a configuration of a transfer according to a fifth modification example.

For example, as shown in FIG. 8, the transfer 12 according to a fifth modification example includes the motor 30 disposed on a different axis from the first input shaft 21 and the second input shaft 22, and a second transmission device 80 provided in the power transmission path between the motor 30 and the second input shaft 22. This fifth modification example is an additional modification example of the third modification example. Further, in the transfer 12, the friction engagement device 61, the planetary gear device 25, the transmission device 26, the second transmission device 80, and the motor 30 are disposed in this order from the engine side in the axial direction.

The second transmission device 80 includes a reduction gear 81 and an input gear 82. The reduction gear 81 is provided on the rotor shaft 33 of the motor 30. The reduction gear 81 meshes with the input gear 82. The input gear 82 is attached to the second input shaft 22 and is rotated integrally with the second input shaft 22. The reduction gear 81 is a gear having a smaller diameter than the input gear 82, and thus a reduction gear train is formed by the reduction gear 81 and the input gear 82. That is, the second transmission device 80 is the speed reducer. Therefore, in the fifth modification example, in a case where the power output from the motor 30 is transmitted to the second input shaft 22 via the second transmission device 80, the rotation of the motor 30 is changed (decelerated) and transmitted to the sun gear S.

Figure 9:
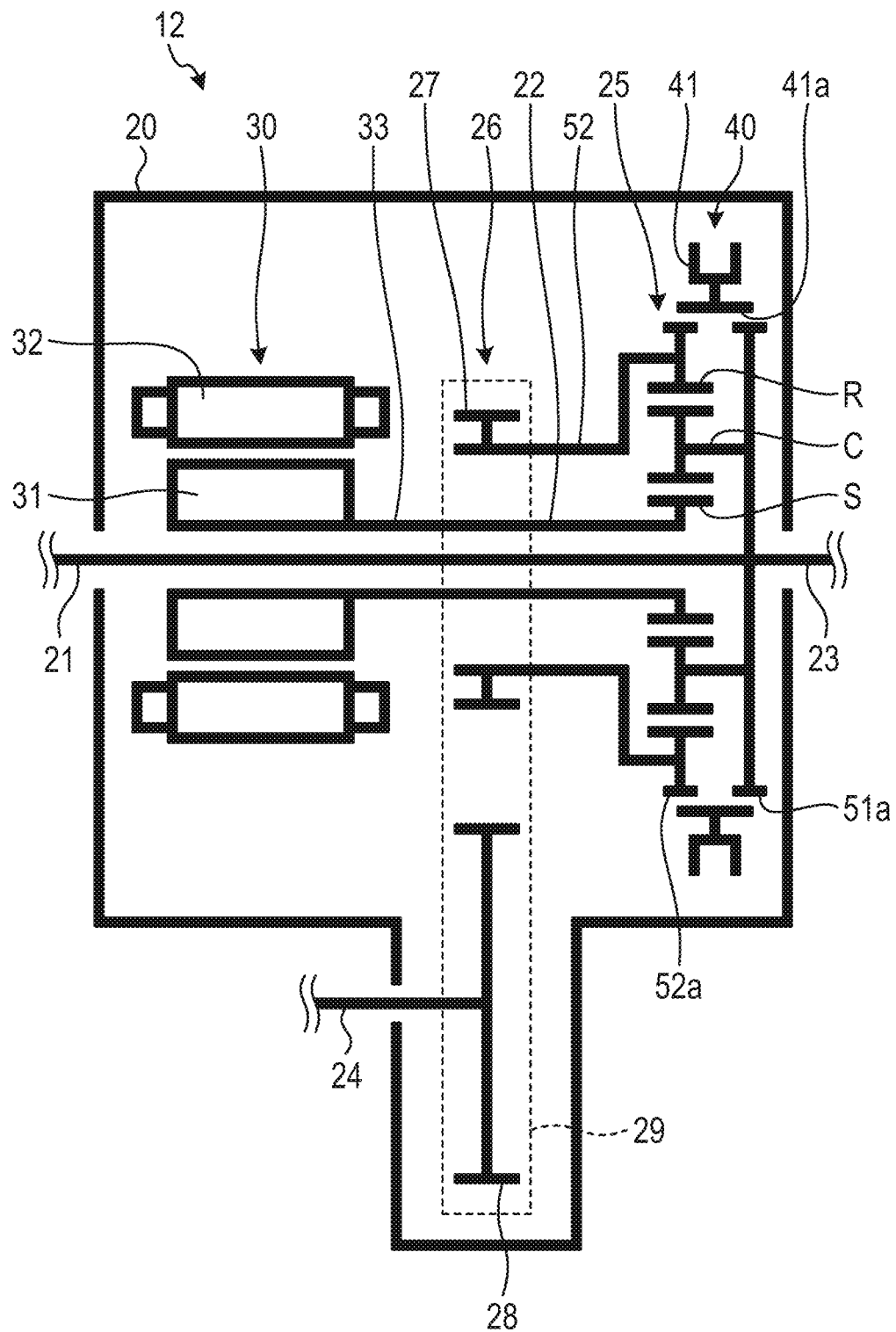
FIG. 9 is a skeleton diagram schematically showing a configuration of a transfer according to a sixth modification example.

In addition, as another modification example, as shown in FIG. 9, in the planetary gear device 25 of the transfer 12 according to a sixth modification example, the motor 30 is connected to the sun gear S, and the first input shaft 21 and the rear wheel side output shaft 23 are connected to the carrier C, and the front wheel side output shaft 24 is connected to the ring gear R. In this sixth modification example, the sun gear S is the first rotation element, the ring gear R is the second rotation element, and the carrier C is the third rotation element.

In the torque split 4WD mode according to the sixth modification example, the motor 30 outputs the torque in the negative direction in order to cause the torque in the positive direction to act on the front wheel side output shaft 24. That is, in a case where the motor 30 outputs the torque in the negative direction and causes the torque in the positive direction to act on the front wheel side output shaft 24 (ring gear R), the torque in the negative direction acts on the rear wheel side output shaft 23 (carrier C) due to the torque reaction force. As a result, the torque in the positive direction due to the torque from the engine 2 and the torque in the negative direction due to the torque reaction force of the motor torque act on the rear wheel side output shaft 23.

What is claimed is:

1. A power transmission device, comprising:
   a first input shaft configured to input power from a first power source;
   a second input shaft configured to input power from a second power source;
   a first output shaft configured to output power to a first drive wheel;
   a second output shaft configured to output power to a second drive wheel;
   a differential gear including, as three rotation elements, a first rotation element to which the second input shaft is connected, a second rotation element to which the second output shaft is connected, and a third rotation element to which the first input shaft and the first output shaft are connected, wherein an engagement device configured to selectively connect two of the three rotation elements is provided; and
   a first transmission device provided in a power transmission path between the differential gear and the second output shaft, wherein:
   the first output shaft is disposed on the same axis as the first input shaft;
   the second output shaft is disposed parallel to the first output shaft and is connected to the differential gear via the first transmission device to be able to transmit power;
   the first transmission device and the differential gear are disposed in this order from a side of the first power source on the same axis as the first output shaft; and
   the second output shaft extends from the first transmission device to the side of the first power source in an axial direction.

2. The power transmission device according to claim 1, wherein the engagement device is configured to selectively connect the second rotation element and the third rotation element.

3. The power transmission device according to claim 1, wherein the engagement device is a friction engagement device.

4. The power transmission device according to claim 3, wherein the engagement device is configured to selectively connect the first rotation element and the second rotation element.

5. The power transmission device according to claim 1, wherein the differential gear is a planetary gear device.

6. The power transmission device according to claim 1, wherein the first transmission device includes a chain belt.

7. The power transmission device according to claim 1, wherein the engagement device is switched between an engagement state where the three rotation elements are integrally rotatable and a disengagement state where the three rotation elements are differentially rotatable.

8. The power transmission device according to claim 1, wherein:
   the differential gear and the second power source are disposed in this order from the side of the first power source on the same axis as the first output shaft; and
   the second output shaft extends from a position between the differential gear and the second power source to the side of the first power source in the axial direction.

9. The power transmission device according to claim 1, wherein
   the first transmission device includes
   a drive gear on the same axis as the first input shaft and configured to transmit the power to the second output shaft, a driven gear provided integrally with the second output shaft, and a chain belt connecting the drive gear and the driven gear.

10. A power transmission device, comprising:

a first input shaft configured to input power from a first power source;

a second input shaft configured to input power from a second power source;

a first output shaft configured to output power to a first drive wheel;

a second output shaft configured to output power to a second drive wheel;

a differential gear including, as three rotation elements, a first rotation element to which the second input shaft is connected, a second rotation element to which the second output shaft is connected, and a third rotation element to which the first input shaft and the first output shaft are connected, wherein an engagement device configured to selectively connect two of the three rotation elements is provided; and a first transmission device provided in a power transmission path between the differential gear and the second output shaft, wherein:

the first output shaft is disposed on the same axis as the first input shaft;

the second output shaft is disposed parallel to the first output shaft and is connected to the differential gear via the first transmission device to be able to transmit power;

the first transmission device and the engagement device are disposed in this order from a side of the first power source on the same axis as the first output shaft; and the second output shaft extends from the first transmission device to the side of the first power source in an axial direction.

11. The power transmission device according to claim 10, wherein the first transmission device includes a drive gear on the same axis as the first input shaft and configured to transmit the power to the second output shaft, a driven gear provided integrally with the second output shaft, and a chain belt connecting the drive gear and the driven gear.

12. A power transmission device, comprising:

a first input shaft configured to input power from a first power source;

a second input shaft configured to input power from a second power source;

a first output shaft configured to output power to a first drive wheel;

a second output shaft configured to output power to a second drive wheel;

a differential gear including, as three rotation elements, a first rotation element to which the second input shaft is connected, a second rotation element to which the second output shaft is connected, and a third rotation element to which the first input shaft and the first output shaft are connected, wherein an engagement device configured to selectively connect two of the three rotation elements is provided; and a first transmission device provided in a power transmission path between the second power source and the differential gear, wherein the second power source is disposed on a different axis from the first output shaft and the second output shaft and is connected to the differential gear via the first transmission device to be able to transmit power.

13. The power transmission device according to claim 12, wherein the first transmission device is a speed reducer.

* * * * *